United States Patent [19]

Muto

[11] Patent Number: 5,495,316
[45] Date of Patent: Feb. 27, 1996

[54] ELECTROPHOTOGRAPHIC APPARATUS AND METHOD

[75] Inventor: Kiyoshi Muto, Yokkaichi, Japan

[73] Assignee: Brother Kogyo Kabushiki Kaisha, Nagoya, Japan

[21] Appl. No.: 154,529

[22] Filed: Nov. 19, 1993

[30] Foreign Application Priority Data

Feb. 24, 1993 [JP] Japan .................................. 5-035290

[51] Int. Cl.⁶ .................................................. G03G 21/00
[52] U.S. Cl. ........................................ 355/208; 355/219
[58] Field of Search ................................. 355/204, 208, 355/219, 220, 235

[56] References Cited

U.S. PATENT DOCUMENTS 4,794,423  12/1988  Shimizu et al. ...................... 355/208 X
5,093,688  3/1992   Komiya et al. ...................... 355/204 X
5,321,478  6/1994   Nakamura et al. .................. 355/204 X

FOREIGN PATENT DOCUMENTS 2-134258  5/1990  Japan .

*Primary Examiner*—Nestor R. Ramirez
*Attorney, Agent, or Firm*—Oliff & Berridge

[57] ABSTRACT

An electrophotographic apparatus includes a control device for controlling a charger to start a high voltage supply operation so that a scanner unit and a photosensitive drum are simultaneously allowed to carry out a normal exposure operation and a normal photosensitizing operation, respectively. Through this control of the high voltage supply, a first print time can be shortened.

14 Claims, 8 Drawing Sheets

ELECTROPHOTOGRAPHIC APPARATUS AND METHOD

BACKGROUND OF THE INVENTION

1. Field of the Invention

This invention relates to an electrophotographic apparatus in which a print time required for a first print sheet is shortened.

2. Description of the Related Art

One type of electrophotographic apparatus has been conventionally a laser printer as shown in FIG. 8. This laser printer mainly comprises an image forming device, a fixing device 24 and a sheet feeding device.

The image forming device includes a photosensitive drum 18, a charger 15 for charging the photosensitive drum 18, a scanner unit 19 for carrying out an exposure operation to form an image on the photosensitive drum 18 in accordance with a print data, a developing device 20 for developing an electrostatic latent image formed through the exposure process to form a toner image on the photosensitive drum 18, a transfer unit 21 for transferring the toner image developed on the photosensitive drum 18 onto a sheet 11, and a discharger 22 for discharging the sheet 11 to exfoliate the sheet 11 from the photosensitive drum 18 after the transfer process.

The fixing device 24 includes a heat roller 25 for fixing the toner image on the sheet 11, a heater 26, which is secured to the heat roller 25 and serves to heat the heat roller 25, and a temperature sensor 31, which is secured to the frame of the fixing device so as to be in contact with the heat roller 25 under pressure and serves to detect the temperature of the heat roller 25. The fixing device 24 is further provided with a support roller 32 that is paired with the heat roller 25. A fan motor 30 is disposed in the vicinity of the fixing device 24.

The sheet feeding device serves to connect the elements as described above, and feed the sheet 11 to each element. It includes an automatic sheet supply device 10, a sheet guide member comprising a sheet guide 12, etc., and a roller member comprising a register roller 14, etc.

The print operation of the laser printer thus constructed will be described along the path of the print sheet with reference to FIG. 8.

Upon reception of a print instruction, the heater 26 is first actuated, and the temperature sensor 31 detects the temperature of the heat roller 25. After the temperature of the heat roller 25 exceeds a predetermined fixing temperature, which is required to sufficiently fix the toner image onto the sheet 11, the scanner unit 19 is actuated. After a while, the rotational speed of a scanner motor built in the scanner unit 19 reaches a constant high rotational speed, the photosensitive drum 18 is rotated at the time when the exposure process is allowed to be carried out, and a high voltage is applied to the charger 15 to charge the surface of the photosensitive drum 18. After the photosensitive drum 18 makes one revolution and the surface of the photosensitive drum 18 is homogeneously charged by charger 15, the feeding of the sheet 11 is started.

The sheet 11 is supplied from the automatic sheet supply device 10, which is provided at a lower portion inside of the main body 1 of the laser printer and fed to the image forming device while being guided by the sheet guide 12. When the sheet is detected by a sheet detection sensor 13, a pair of resist rollers 14, which are provided downstream of the sheet detection sensor 13, start their rotation after a predetermined time lapse on the basis of a sheet detection signal from the sheet detection sensor 13. The sheet 11 is contacted with the resist rollers 14 to correct its oblique orientation and then fed out from the resist rollers 14 to the downstream side in synchronism with the rotation of the resist rollers 14. Thereafter, the sheet 11 is guided by a sheet guide 16 provided downstream of the resist rollers 14 and fed to the image forming device by a carry roller 17 provided downstream of the sheet guide 16. The sheet 11 is guided in close contact with the photosensitive drum 18.

In the image forming device, print data is formed as an electrostatic latent image on the photosensitive drum 18 by scanning the photosensitive drum 20 with a laser beam from the scanner unit 19. Further, in the developing device 20, toner supplied from the developing device 20 is absorbed onto the electrostatic latent image by the electrostatic charge of the electrostatic latent image to thereby develop the electrostatic latent image.

By charging the sheet 11 in the transfer unit 21, a toner image that is visualized in the developing device 20 is transferred onto the sheet 11. After the transfer process, in the discharger 22, the charged sheet 11 is and exfoliated from the photosensitive drum 18 to which the sheet 11 is closely contacted. Thereafter, the exfoliated sheet 11 is guided by a feeding guide unit 23 disposed downstream of the image forming device and fed to the fixing device 24 provided further downstream of the image forming device.

The sheet 11, which is fed from the feeding guide unit 23, is sandwiched between the heat roller 25 maintained at a predetermined temperature and the support roller 32, and it is fed toward a pair of feed-out rollers 33 provided downstream of the heat roller 25 and the support roller 32. At this time, the toner image on the sheet 11 is fixed onto the sheet 11 by the heat of the heat roller 25. Subsequently, the sheet 11 is fed from the fixing device 24 to a sheet discharge unit 27.

The sheet 11 is guided to the sheet discharge unit 27 and fed onto a sheet discharge tray 29 through rotation of a pair of sheet discharge rollers 28. After the above operations are carried out, the printing operation is terminated.

During printing, the temperature of the heat roller 25 is detected by the temperature sensor 31. If the detected temperature is below a predetermined temperature, the heater 26 is turned on. On the other hand, if the detected temperature is above the predetermined temperature, the heater 26 is turned out. That is, the temperature of the heat roller 25 is controlled to be constant. However, when the heater 26 is turned on, the heat of the heater 26 causes the temperature inside of the main body 1 of the laser printer to be also increased, and thus, the scanner unit 19 and other elements are also heated. Therefore, the output power of the laser beam is fluctuated, and the printing operation suffers adversely. In order to avoid such an adverse operation, the laser printer is provided with a fan motor 30, and the warmed air in the main body 1 of the laser printer is discharged to the outside of the main body 1 of the laser printer by rotating the fan motor 30, thereby cooling the inside of the main body 1 of the laser printer.

In the printing process as described above, it takes a significant amount of time to complete a printing operation for a first sheet (hereinafter referred to as "first print time"). That is, a first time of several seconds is required until the temperature of the heat roller 25 reaches the predetermined value, a second time of several seconds is further required until the scanner unit 19 is allowed to carry out the exposure operation, a third time of several seconds is further required from the time when the high voltage is applied to the photosensitive drum 18 until the time when the photosensitive drum 18 can photosensitize light, and a fourth time of several seconds is further required until the sheet 11 is fed to a predetermined position where the toner image is transferred onto the sheet 11. Accordingly, as much as 22–24 seconds (the sum of the first, second, third and fourth times) are required to prepare for the printing operation of the first sheet (hereinafter referred as "first printing operation").

SUMMARY OF THE INVENTION

An object of this invention is to provide an electrophotographic apparatus in which the charger starts its high-voltage supplying operation so that the exposure device and the photosensitive drum are simultaneously transferred to such states that a normal exposure operation and a normal photosensitizing operation can be carried out, thereby shortening a first print time.

In order to attain the above object, an electrophotographic apparatus according to this invention equipped with a sheet feeding device for feeding a print sheet to a transfer unit, a charger for applying a high voltage to a photosensitive drum, an exposure device for forming an electrostatic latent image on the photosensitive drum, a developer for attaching toners to the electrostatic latent image formed on the photosensitive drum to form a toner image on the photosensitive drum, a transfer device for transferring the toner image formed on the photosensitive drum onto a print sheet, and a fixing device for fixing the image formed on the print sheet, wherein after a predetermined time elapses from an actuation-start time of the exposure device, the exposure device can carry out its normal exposure operation performing stable laser scanning, and the photosensitive drum is supplied with a high voltage for a predetermined time by the charging device to homogeneously charge the surface of the photosensitive drum, so that the photosensitive drum can carry out normal photosensitizing. The apparatus also includes a control device for determining the timing at which the charger starts the high-voltage supply operation so that the exposure device and the photosensitive drum are simultaneously transferred to states where they can carry out the normal exposure operation and the normal photosensitizing operation, respectively.

The control device may calculate the time difference between the period from the actuation-start time of the exposure device until the time when the exposure device can carry out the normal exposure operation, and the period from the time when the high voltage is applied to the photosensitive drum until the time when the photosensitive drum can carry out the normal photosensitive operation, thereby actuating the charger at the time when the time difference elapses from the actuation-start time of the exposure device.

According to the electrophotographic apparatus thus constructed, the timing of the high-voltage supply operation from the charger to the photosensitive drum is so determined that the transfer of the exposure device and the transfer of the photosensitive drum to the state where the normal exposure operation and the normal photosensitive operation are allowed, respectively, are simultaneously achieved.

DETAILED DESCRIPTION OF PREFERRED EMBODIMENTS

A preferred embodiment according to this invention will be described hereunder with reference to the accompanying drawings.

Figure 8:
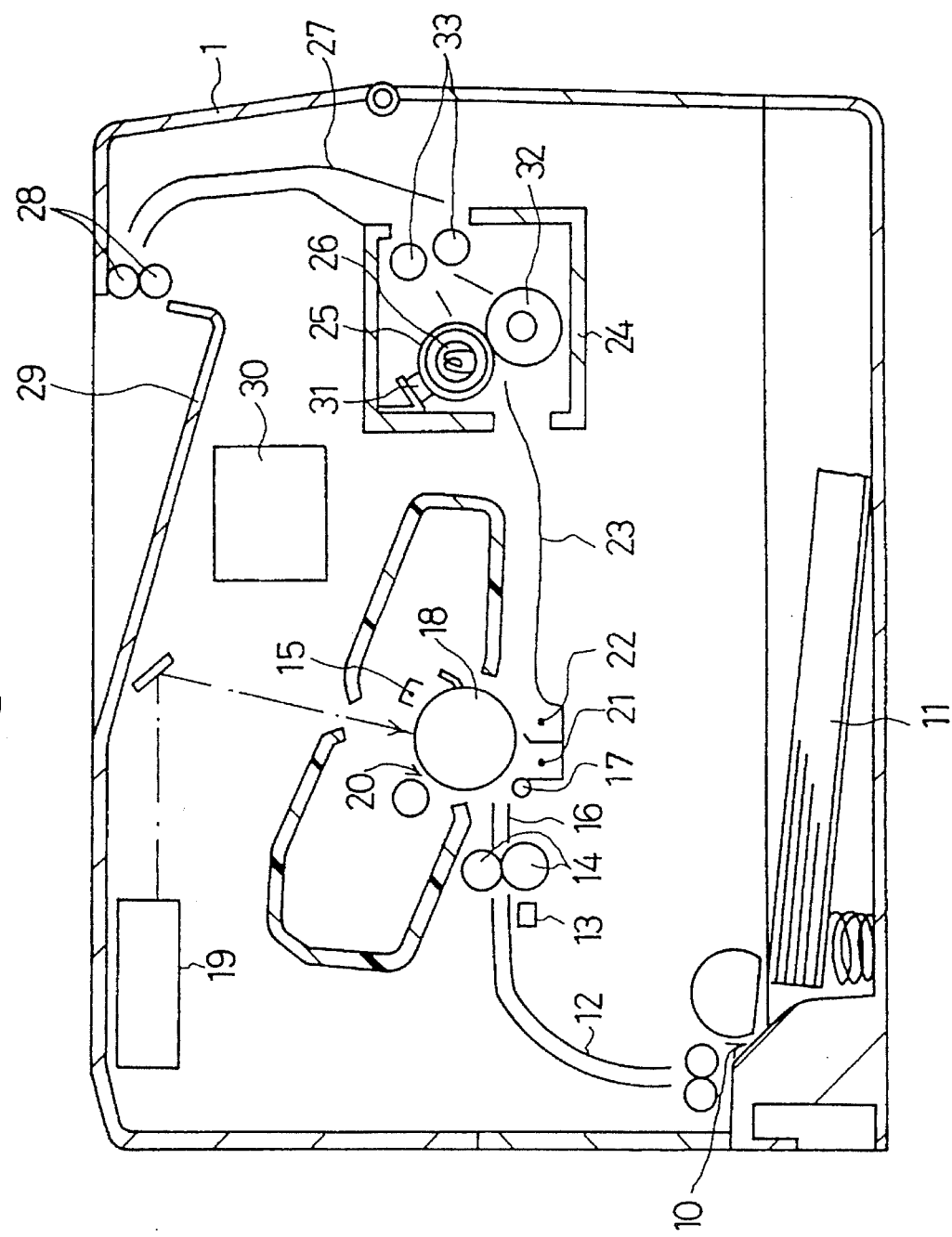
FIG. 8 is a schematic diagram showing the construction of a conventional laser printer.

In this embodiment, the electrophotographic apparatus of this invention is applied to a laser printer. The construction of the laser printer is identical to that of the conventional one (see FIG. 8), and the detailed description thereof is omitted. Like elements are represented by the same reference numerals.

Figure 1:
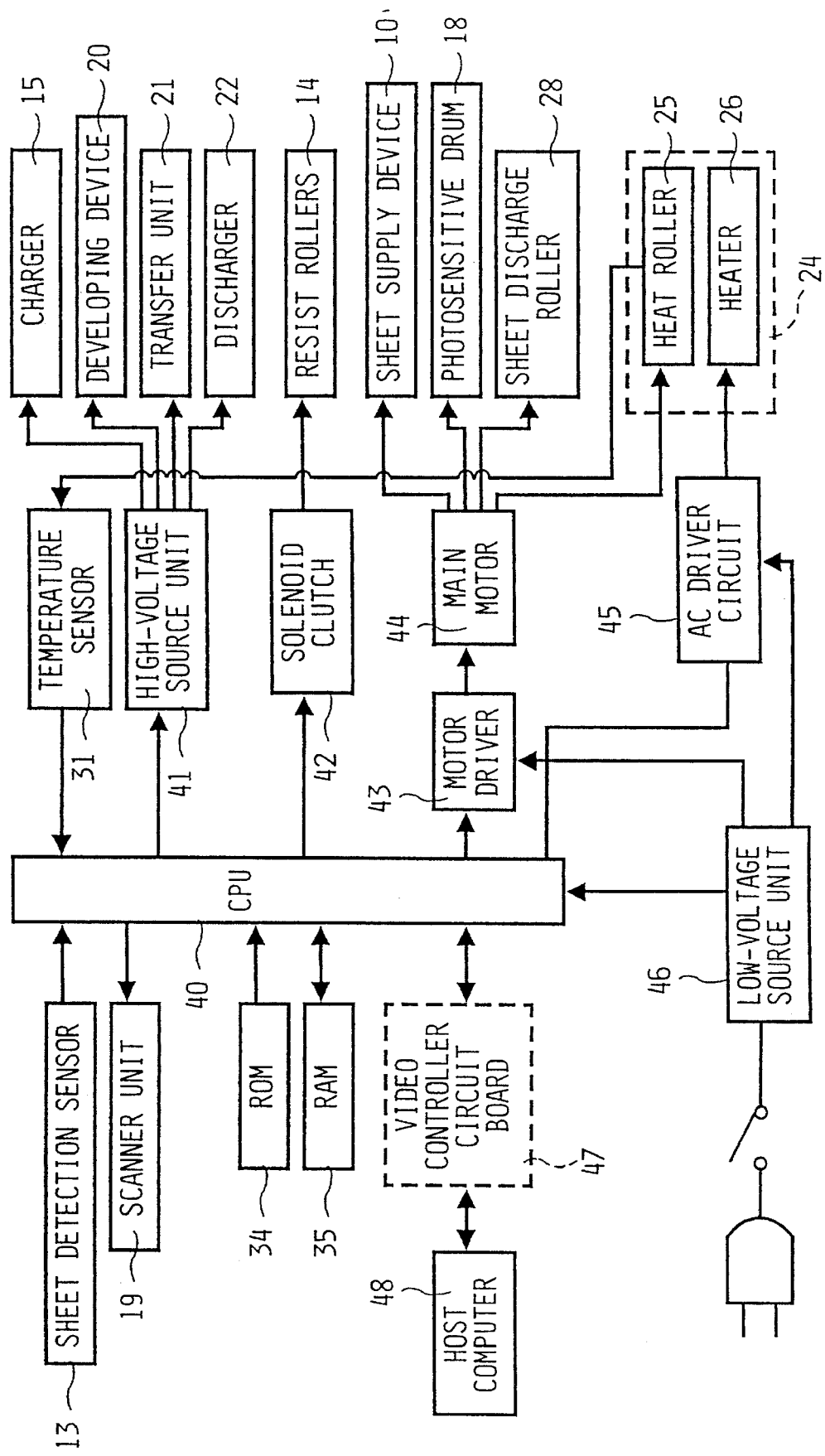
FIG. 1 is a block diagram showing the electrical construction of a laser printer according to an embodiment of the invention.

First, the construction for controlling the laser printer will be described with reference to FIG. 1. A CPU 40, which is a main element for controlling the laser printer, is connected through a bus to a sheet detection sensor 13, a scanner unit 19, a ROM 34, a RAM 35, a temperature sensor 31, a high-voltage source unit 41, a solenoid clutch 42, a motor driver 43, an AC driver 45, a low-voltage source unit 46, and a video controller circuit board 47. The CPU 40 is supplied with a voltage from the low voltage source unit 46.

The sheet detection sensor 13 transmits a signal to the CPU upon detection of the sheet 11. The ROM 34 is stored with a program for controlling data communication with the video controller board 47, a program for controlling rotation/stop of a main motor 44, application of high voltage, timing data, etc. The CPU 40 measures a rise-up time of a scanner motor 52 in the scanner unit 19 as described later and writes the measured value into the RAM 35.

The high-voltage source unit 41 generates plural high voltages that are controlled by the CPU 40 and supplies these voltages to the charger 15, the developing device 20, the transfer unit 21 and the discharger 22, respectively. The charger 15 corresponds to the charging means of this invention.

The motor driver 43 drives the main motor 44, and the main motor 44 is connected to the sheet supply device 10, the photosensitive drum 18, the sheet discharge roller 28 and the heat roller 25. Each of these elements is controlled by the CPU 40. The main motor 44 drives the resist rollers 14 through signals from the CPU 40 and the solenoid clutch 42. The resist rollers 14 correspond to the sheet feeding means of this invention.

The AC driver circuit 45 is a circuit for controlling the heater 26 and an AC power source through the CPU 40 in accordance with the temperature of the heat roller 25. The temperature sensor 31 transmits information on the temperature of the heat roller 25 in the fixing device 24.

The video controller circuit board 47 expands print contents and print commands transmitted from the host computer 48 into concrete print data, and the CPU 40 controls the scanner unit 19 on the basis of the print data. Further, the CPU 40 carries out data communication with the video controller circuit board 47 and informs an operator of an engine status (occurrence of abnormality, etc.).

Figure 2:
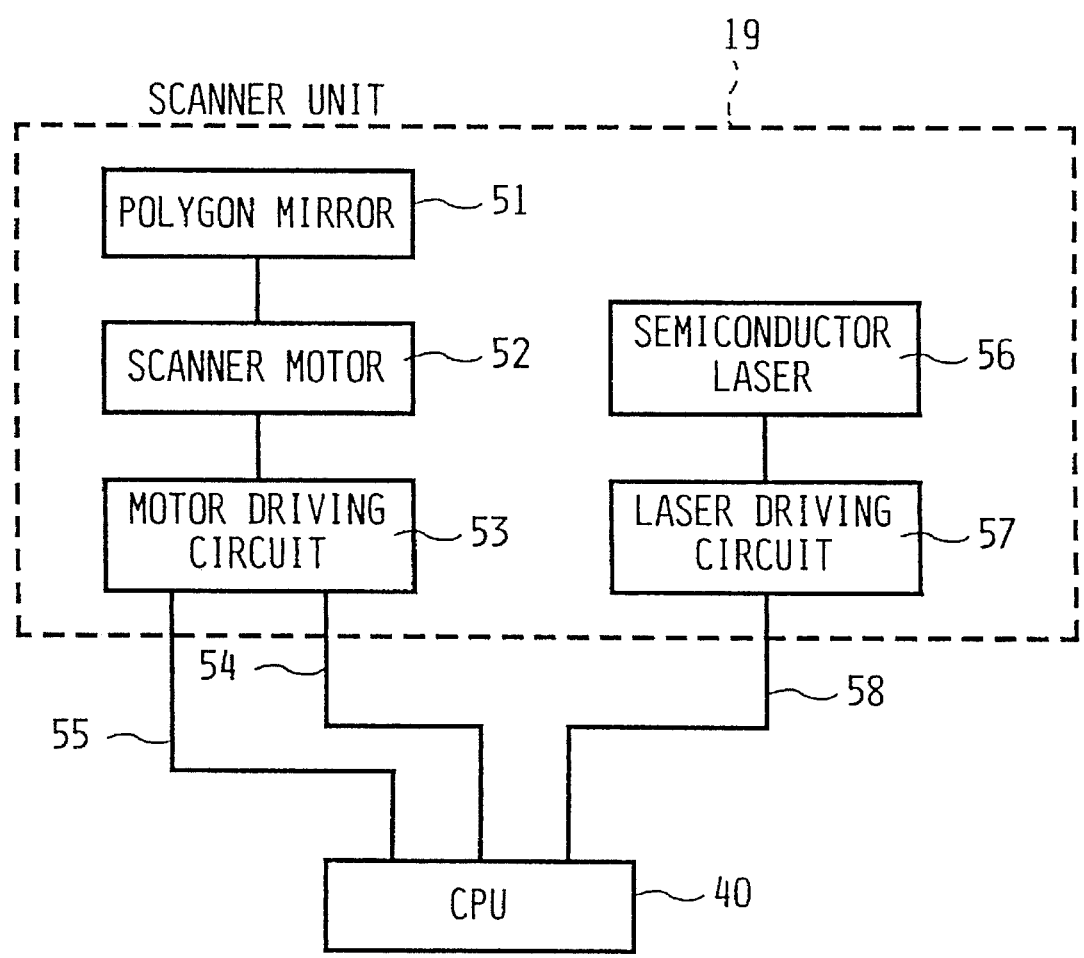
FIG. 2 is a block diagram showing the detailed construction of a scanner unit of the laser printer.

The details of the scanner unit 19 will be next described with reference to FIG. 2.

The scanner unit 19 includes a semiconductor 56 for emitting a laser beam that will be irradiated onto the photosensitive drum 18, a laser driving circuit 57 for driving the semiconductor laser 56, a scanner motor 52 to which a polygon mirror 51 for sweeping the laser beam on the photosensitive drum 18 is secured, and a motor driving circuit 53 for rotationally driving the scanner motor 52.

The laser driving circuit 57 and the CPU 40 are connected to each other through a laser control signal line 58, and the laser beam is emitted from the semiconductor laser 56 when a laser turn-on signal is transmitted from the CPU 40 through the laser control signal line 58 to the laser driving circuit 57.

The motor driving circuit 53 and the CPU 40 are connected to each other through a motor control signal line 55 and a rotation detection signal line 54, and the scanner motor 52 starts its rotational motion when a motor driving signal is transmitted from the CPU 40 through the motor control signal line 55 to the motor driving circuit 53. When the rotational speed of the scanner motor 52 reaches a predetermined speed, a signal indicating that a normal exposure operation is allowed to be carried out is transmitted through the rotation detection signal line 54 to the CPU 40. The scanner unit 19 corresponds to the exposure means of this invention.

The operation of the laser printer thus constructed will be described with reference to the flowchart of FIG. 3. In the following description, Si (i=1, 2, 3, ...) represents each step of the flowchart.

Figure 3:
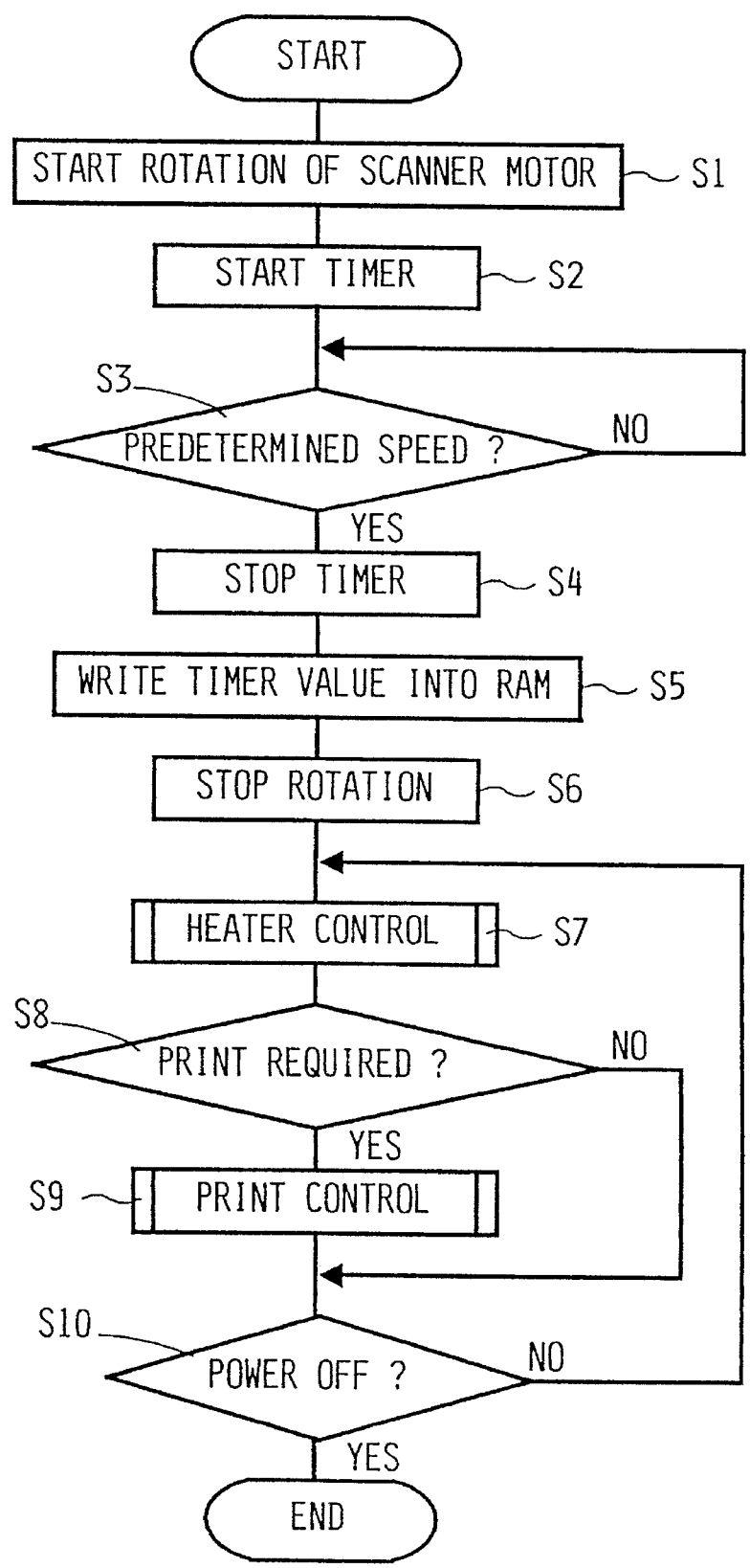
FIG. 3 is a flowchart showing the operation of the laser printer.

First, upon switch-on of the power source of the laser printer, the CPU 40 carries out a predetermined initializing operation and executes the processing in accordance with the flowchart as shown in FIG. 3.

As a start check-out operation, the rotation of the scanner motor 52 is started through the motor driving circuit 53 in response to a signal from the CPU 40 (S1). Subsequently, a timer built in the CPU 40 is started (S2), and the measurement of the rise-up time for the scanner motor 52 is started.

A signal (rotation detection signal line 54) output from the motor driving circuit 53 is read in the CPU 40, and it is judged in the CPU 40 whether the rotational speed of the scanner motor 52 has reached a predetermined speed (S3) in the range of 5,000–13,000 RPM, and preferably about 6,600 RPM. If the rotational speed is judged to reach the predetermined speed (S3: YES), the timer is stopped (S4). If not (S3: NO), the judging operation at step S3 is continued until the rotational speed reaches the predetermined speed.

After the rotational speed of the scanner motor 52 reaches the predetermined speed and the timer is stopped, the value (represented by t1 (about 5 seconds)) of the timer is written into the RAM 35 (S5), and the rotation of the scanner motor 52 is stopped (S6).

Subsequently, a subroutine for controlling the heater as described later is executed at a stand-by temperature (TW) (S7), and it is judged whether the print start requirement is output from the video controller circuit board 47 (S8). If the requirement is judged to be output (S8: YES), a print control subroutine is executed (S9).

In the case where the print control subroutine is finished and the print starting requirement is not output from the video control circuit board 47 (S8: NO), it is judged whether the power source of the laser printer is switched off (S10). If the power source is judged to be switched off (S10: YES), the control subroutine is terminated. If not (S10: NO), the program returns to step S7. The series of operations as described constitute a main control program.

Figure 4A:
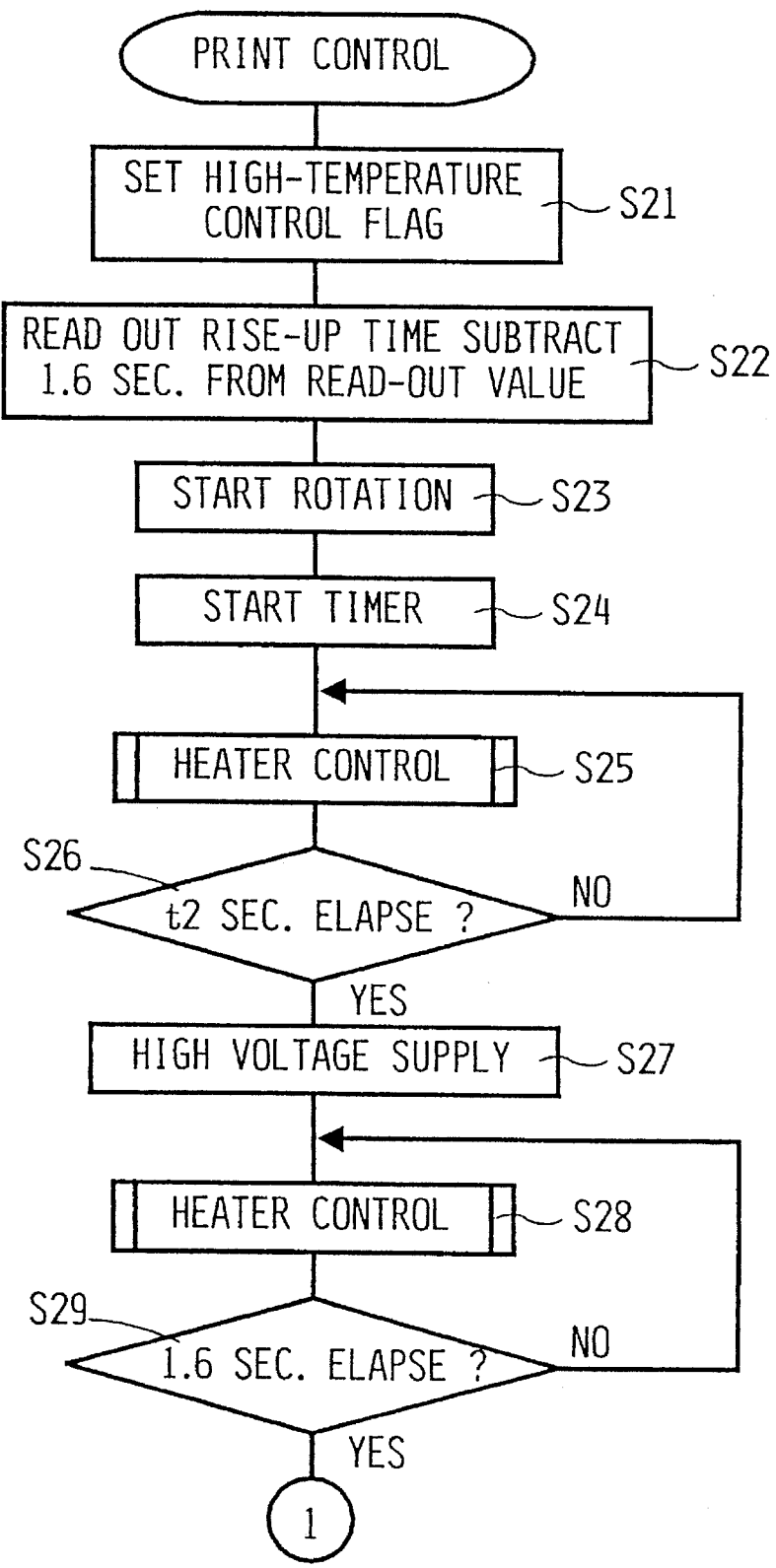
FIGS. 4(*a*) and 4(*b*) show a flowchart illustrating the printing operation of the laser printer.
Figure 4B:
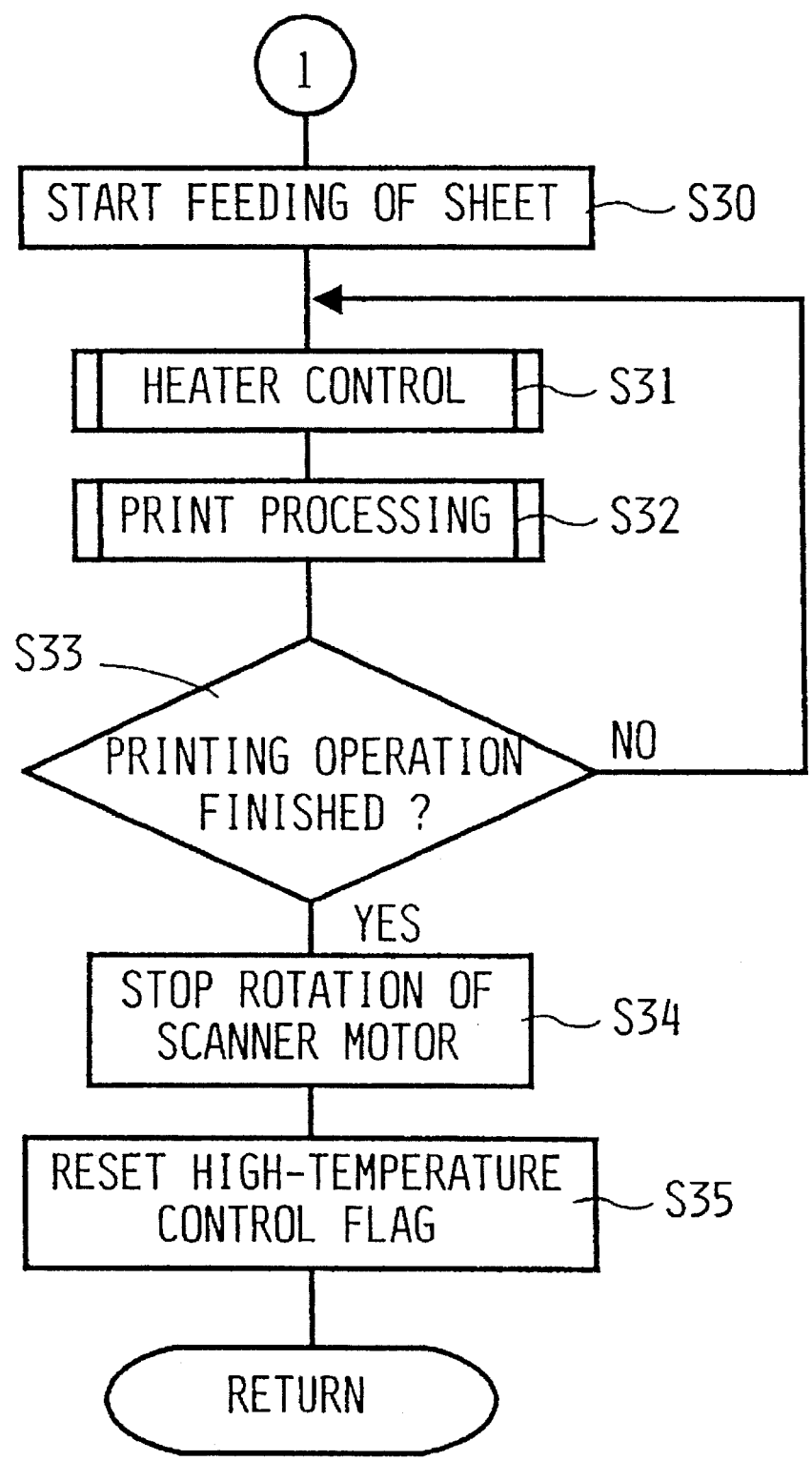

Next, the print control subroutine will be described. FIGS. 4(a) and 4(b) are flowcharts for the print control subroutine.

When the start of the print control is instructed by the CPU 40, a high-temperature control flag is set (S21), that is, the control temperature of the heat roller of the fixing device 24 is set to a fixing temperature (170° C., for example). Subsequently, the rise-up time t1 of the scanner motor 52 that was written into the RAM 35 at the power-on time is read out, and a value (represented by t2 (about 3.4 seconds)), which corresponds to a subtraction value between the read-out time and a time required for the charges on the surface of the photosensitive drum 18 to be constant (about 1.6 seconds), is written into the RAM 35 (S22). Subsequently, the rotation of the scanner motor 52 is started through the motor driving circuit 53 (S23), and at the same time, the timer built in the CPU 40 is started (S24).

The automatic sheet feeding device 10 starts the supply of the sheet 11. The sheet 11 is guided to the resist rollers 14 by the sheet guide 12 and is temporarily kept on standby. Through this operation, the sheet 11 is shifted to the position where it can be subjected to the printing operation.

Thereafter, the CPU 40 continues the heater control subroutine (S25) until the timer counts t2 seconds. If t2 seconds elapses (S26: YES), the CPU 40 supplies the high-voltage source unit 41 with an instruction to supply high-voltage to the charger 15 (S27).

Subsequently, at step S28, the CPU 40 judges whether the 1.6 seconds elapses from the supply of the high voltage (S27) while executing the heater control subroutine (S28). If the 1.6 elapses (S29: YES), the CPU 40 transmits an instruction to the solenoid clutch 42. In response to the instruction, the solenoid clutch 42 is switched on, and feeding of the sheet 11 to the image forming device by the resist rollers 14 is started (S30). At this time, both the scanner unit 19 and the photosensitive drum 20 are simultaneously transferred to the state where they can carry out the normal exposure operation and the normal photosensitizing operation, respectively.

The sheet 11 is fed to the image forming device downstream of the sheet guide 16 and the feed-roller 17, and the printing operation is carried out (S32).

In the image forming device, like the prior art, the scanner unit 19 converts the print data transmitted from the host computer 48 into an electrostatic image on the photosensitive drum 18. The developing device 20 converts the electrostatic latent image into a toner image, and the transfer unit 21 transfers the toner image onto the sheet 11. Subsequently, the sheet 11 is exfoliated from the photosensitive drum 18 by the discharger 22, guided by the feeding guide 23 at the downstream side, and fed to the fixing device farther downstream.

Through the heater control, the increase of the temperature of the fixing device 24 to about 170° C. is continued until the sheet 11 is fed to the fixing device 24. Accordingly, the fixing device 24 can immediately take in the sheet 11 without requiring time for the temperature increase and can carry out the heat fixing operation of the transferred toner image on the sheet 11.

After the printing operation is finished (S33: YES), the rotation of the scanner motor 52 is stopped (S34). The high-temperature control flag for the heater control is reset (S35) to terminate the print control subroutine, and the program returns to the main control program (S36).

Figure 5:
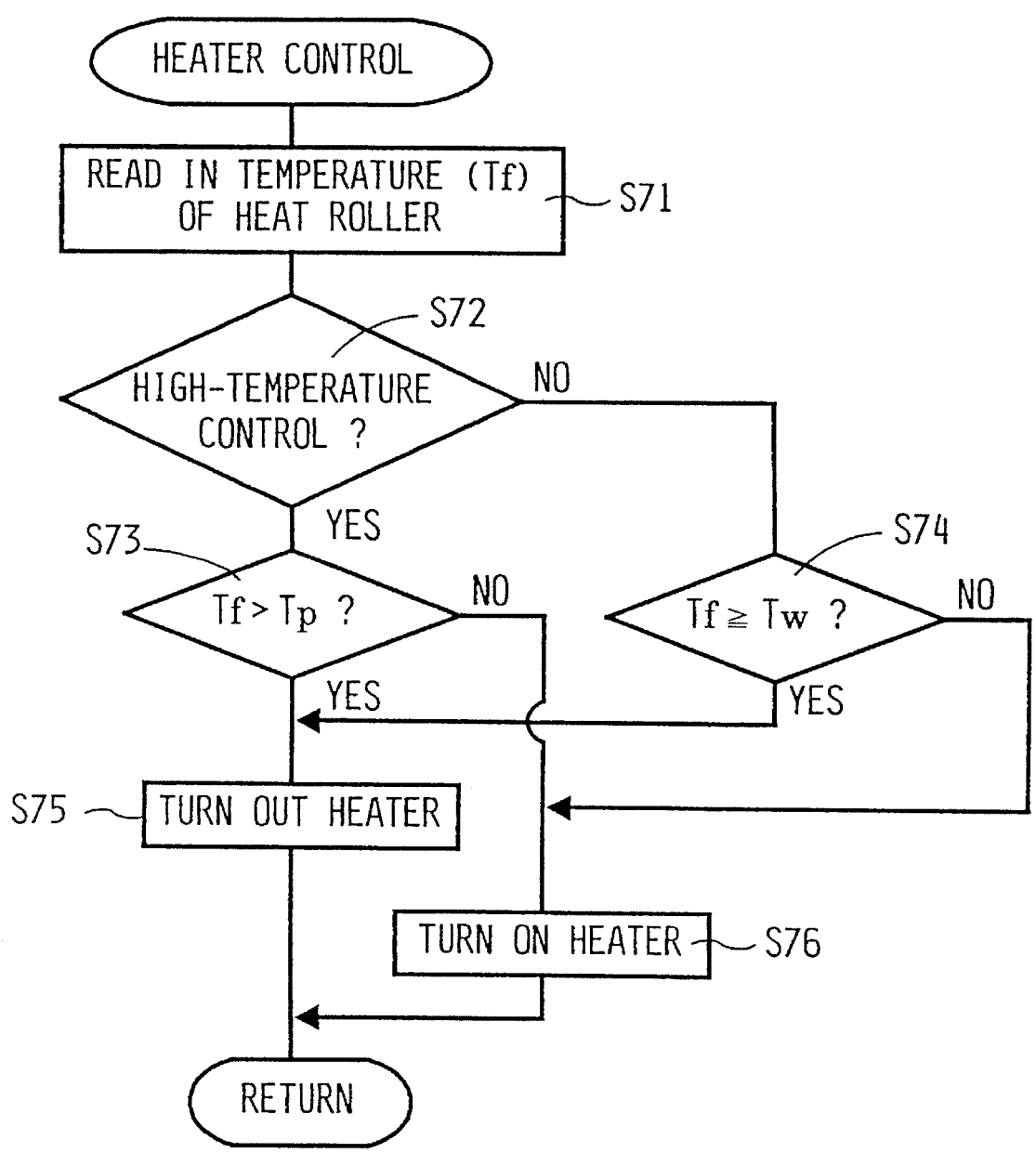
FIG. 5 is a flowchart showing the operation of a heater of the laser printer.

Next, the heater control subroutine will be described with reference to FIG. 5.

When the start of the control of the heater 26 is instructed by the CPU 40, the temperature Tf of the heat roller 25 is detected by the temperature sensor 31 (S71).

Subsequently, it is judged on the basis of a high-temperature control flag whether the current heater control is the high-temperature control (S72). If the high-temperature control flag is set (S72: YES), the current status is judged to be at the print time, and it is judged whether the temperature Tf of the heat roller is above a predetermined fixing temperature TP of the heat roller 2, that is, above about 170° C. (S73). If no high-temperature control flag is set (S72: NO), the current status is judged to be on standby, and it is judged whether the temperature of the heat roller 25 is above a predetermined standby temperature Tw of the heat roller 25, that is, above about 150° C. (S74).

If at step S73 or S74, the temperature Tf of the heat roller 25 is judged to be higher than the beforehand-set temperature (Tp or Tw) (S73, S74: YES), the heater 26 of the fixing device 24 is turned out through the AC driver circuit 45 (S75), and the program returns from the subroutine (S77). On the other hand, if the temperature Tf of the heat roller 25 is judged to be lower than Tp or Tw (S73, S74: NO), the heater 26 of the fixing device 24 is turned on through the AC driver circuit 45 to increase the temperature of the heat roller 25, and the program returns from the subroutine to terminate the heater control.

Figure 6:
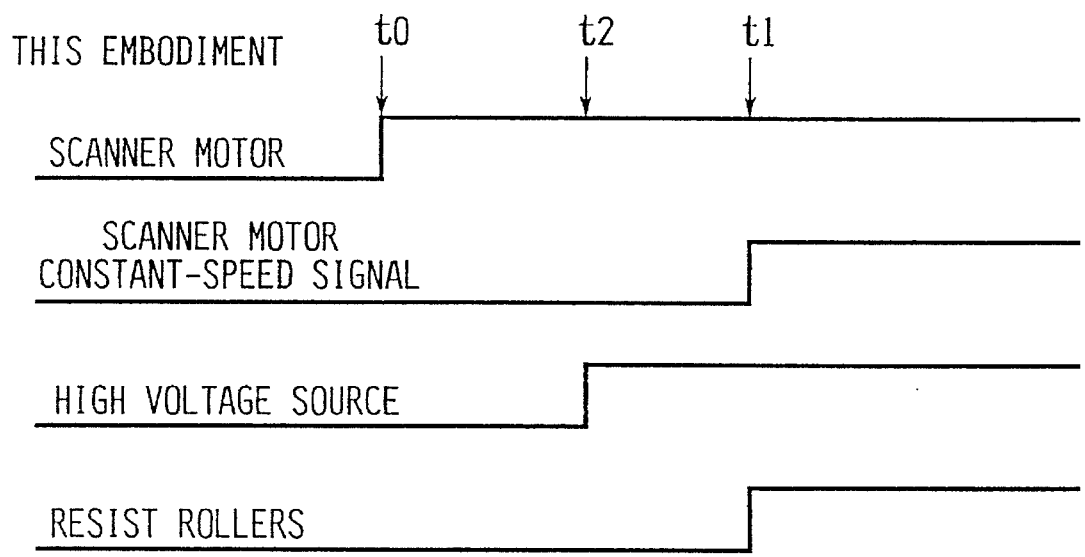
FIG. 6 shows timing charts of the operation of the invention.
Figure 7:
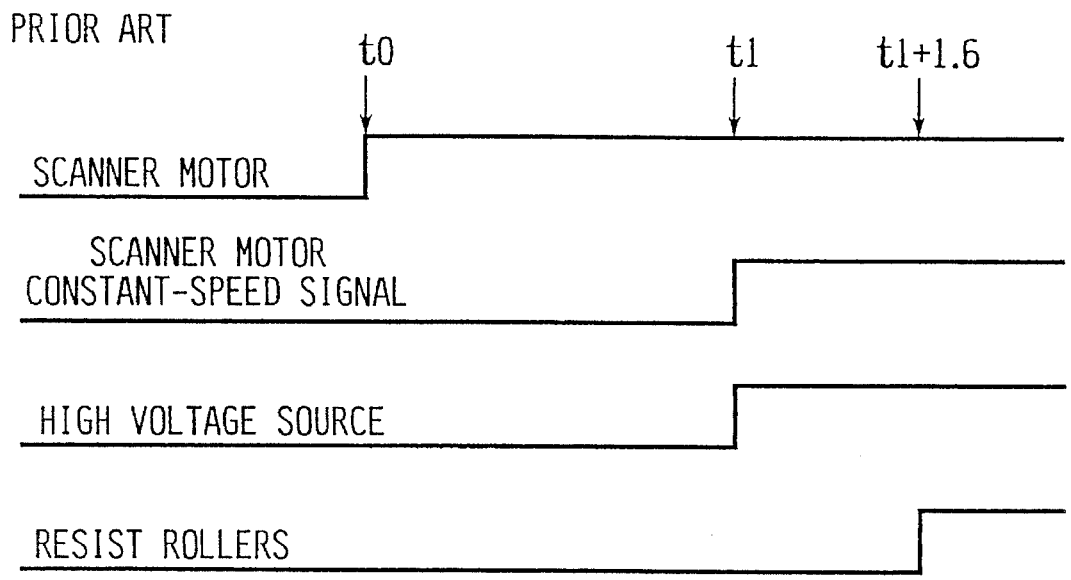
FIG. 7 shows comparison timing charts for the prior art laser printers.

As described above, according to the laser printer of this embodiment, when the print start instruction is output, the rotation of the scanner motor 52 is first started, and the sheet supply operation of the sheet 11 is carried out. Further, the high-voltage source unit is switched on to supply the high voltage before the rotational speed of the scanner motor 52 reaches the predetermined speed. As a result, the first print time is shortened by a time corresponding to the above parallel processing. FIGS. 6 and 7 show compared timing charts of the prior art and the present invention.

Feeding of the sheet 11 is started before the temperature of the heat roller 25 inside of the fixing device 24 reaches the fixing temperature (170° C.), and the heater control is conducted such that the temperature of the heat roller 25 is equal to 170° C. before the sheet 11 reaches the fixing device 24. This operation also contributes to the shortening of the first print time.

In the conventional laser printer, the high voltage is supplied only after the rotational speed of the scanner motor 52 reaches the predetermined speed. Therefore, it takes about 23 to 24 seconds to perform the printing operation. On the other hand, in the laser printer of the present invention, the printing operation is completed in about 18 seconds, and the first print time is shortened by about 5 seconds.

The invention is not limited to the above embodiment, and various modifications may be made without departing from the subject matter of this invention.

For example, in the above embodiment, the rise-up time of the scanner motor 52 is measured at the power-on time, and the high voltage is applied in accordance with the measured time. However, in a case where the rise-up time of the scanner motor is predetermined, the time may be written into the ROM 34 to apply the high voltage on the basis of the stored time. In this case, it is not required to measure the rise-up time of the scanner motor 52 at the power-on time.

As is apparent from the foregoing, according to the electrophotographic apparatus of this invention, the supply of the high voltage by the charging means is started so that the exposure means and the photosensitive drum are simultaneously allowed to carry out the normal exposure operation and the normal photosensitizing operation respectively, and through this control of the high voltage supply, the first print time can be shortened.

What is claimed is:

1. An electrophotographic apparatus having sheet feeding means for feeding a print sheet to a transfer unit, charging means for applying a high voltage to a photosensitive drum, exposure means for forming an electrostatic latent image on said photosensitive drum, developing means for attaching toners to the electrostatic latent image formed on said photosensitive drum to form a toner image on the photosensitive drum, transfer means for transferring the toner image formed on said photosensitive drum onto a print sheet, and fixing means for fixing the image formed on the print sheet, wherein after a predetermined time elapses from an actuation-start time of said exposure means, said exposure means is transferred to a normal exposure operation state, and said photosensitive drum is supplied with a high voltage for a predetermined time by said charging means to homogeneously charge the surface of said photosensitive drum, so that said photosensitive drum is transferred to a normal photosensitizing operation state, the apparatus further comprising control means for determining a timing at which said charging means starts the high-voltage supply operation so that said exposure means and said photosensitive drum are simultaneously transferred to said normal exposure operation state and said normal photosensitizing operation state, respectively.

2. The electrophotographic apparatus as claimed in claim 1, wherein said control means comprises:

means for calculating a time difference between a period from the actuation-start time of said exposure means until the time when said exposure means is transferred to the normal exposure operation state, and the period from the time when the high voltage is applied to said photosensitive drum until the time when said photo sensitive drum is transferred to the normal photosensitive operation state; and means for actuating said charging means at the time when the time difference elapses after the actuation-start time of said exposure means.

3. The electrophotographic apparatus as claimed in claim 1, wherein said control means further comprises means for transmitting a signal indicating that a normal exposure operation state has been reached.

4. The electrophotographic apparatus as claimed in claim 3, wherein said control means further comprises means for transmitting a signal indicating that a normal photosensitizing operation state has been reached a predetermined time after transmitting said signal indicating that a normal exposure operation state has been reached.

5. The electrophotographic apparatus as claimed in claim 4, wherein said predetermined time is 1.6 seconds.

6. The electrophotographic apparatus as claimed in claim 4, wherein said exposure means comprises a scanner having a scanner motor, said transmitting means transmitting a signal indicating that a normal exposure operation state has been reached when said scanner motor reaches a predetermined speed.

7. An electrophotographic apparatus comprising a charger for applying a high voltage to a photosensitive drum, and a scanner for forming an electrostatic latent image on said photosensitive drum, said scanner having a scanner motor, the apparatus comprising:

means for measuring a rise-up time of said scanner motor; and means for applying said high voltage in accordance with the measured rise-up time.

8. A method of controlling an electrophotographic apparatus having sheet feeding means for feeding a print sheet to a transfer unit, charging means for applying a high voltage to a photosensitive drum, exposure means for forming an electrostatic latent image on said photosensitive drum, developing means for attaching toners to the electrostatic latent image formed on said photosensitive drum to form a toner image on the photosensitive drum, transfer means for transferring the toner image formed on said photosensitive drum onto a print sheet, and fixing means for fixing the image formed on the print sheet, wherein after a predetermined time elapses from an actuation-start time of said exposure means, said exposure means is transferred to a normal exposure operation state, and said photosensitive drum is supplied with a high voltage for a predetermined time by said charging means to homogeneously charge the surface of said photosensitive drum, so that said photosensitive drum is transferred to a normal photosensitizing operation state, the method comprising the step of:

determining a timing at which said charging means starts the high-voltage supply operation so that said exposure means and said photosensitive drum are simultaneously transferred to said normal exposure operation state and said normal photosensitizing operation state, respectively.

9. The method as claimed in claim 8, further comprising the steps of:

calculating a time difference between a period from the actuation-start time of said exposure means until the time when said exposure means is transferred to the normal exposure operation state, and the period from the time when the high voltage is applied to said photosensitive drum until the time when said photosensitive drum is transferred to the normal photosensitive operation state; and actuating said charging means when the time difference calculated in said calculating step elapses after the actuation-start time of said exposure means.

10. The method as claimed in claim 8, wherein said determining step comprises the step of transmitting a signal indicating that a normal exposure operation state has been reached.

11. The method as claimed in claim 10, wherein determining step comprises the step of transmitting a signal indicating that a normal photosensitizing operation state has been reached a predetermined time after transmitting said signal indicating that a normal exposure operation state has been reached.

12. The method as claimed in claim 11, wherein said predetermined time is 1.6 seconds.

13. The method as claimed in claim 11, wherein said exposure means comprises a scanner having a scanner motor, said transmitting step transmitting a signal indicating that a normal exposure operation state has been reached when said scanner motor reaches a predetermined speed.

14. A method of controlling an electrophotographic apparatus comprising a charger for applying a high voltage to a photosensitive drum, and a scanner for forming an electrostatic latent image on said photosensitive drum, said scanner having a scanner motor, the method comprising the steps of:

measuring a rise-up time of said scanner motor; and applying said high voltage in accordance with the measured rise-up time.

* * * * *